July 3, 1928. 1,675,418

D. N. MEANY ET AL

ELECTRIC FIREPLACE

Original Filed Nov. 24, 1924   2 Sheets-Sheet 1

Inventors:
Daniel N. Meany,
Edward N. Ellsworth,
by Banning & Banning
Attys.

July 3, 1928.

D. N. MEANY ET AL 1,675,418

ELECTRIC FIREPLACE

Original Filed Nov. 24, 1924    2 Sheets-Sheet 2

Fig.3.

Inventors:
Daniel N. Meany,
Edward N. Ellsworth
by Banning & Banning
Attys

Patented July 3, 1928.

1,675,418

UNITED STATES PATENT OFFICE.

DANIEL N. MEANY AND EDWARD N. ELLSWORTH, OF CHICAGO, ILLINOIS, ASSIGNORS TO ELECTRIC FIREPLACE MANUFACTURING COMPANY, OF CHICAGO, ILLINOIS, A CORPORATION OF ILLINOIS.

ELECTRIC FIREPLACE.

Original application filed November 24, 1924, Serial No. 751,773. Divided and this application filed June 19, 1925. Serial No. 38,151.

This invention relates to a grate designed and adapted to be electrically illuminated and heated in such a way as to simulate the appearance and heating properties of an actual grate of live coals for the purpose of not only warming the room wherein the grate is located, but of enhancing the illusion of actual fire created by the appearance of illuminated fuel within the grate.

The invention is directed to the construction and arrangement of heating elements and their association with the grate in such a way as to produce the desired heating effect from a practically concealed point without interfering with or impairing the functioning of the illuminating devices provided for the purpose of creating a visual simulation of actual fire.

The invention further relates to the means provided for wiring the heating circuit in such a way as to advantageously co-operate with the lighting circuits provided for the illuminating elements.

In the drawings:

Fig. 3 is a sectional elevation of the grate looking toward the rear showing the heating elements in front elevation.

Figure 1:
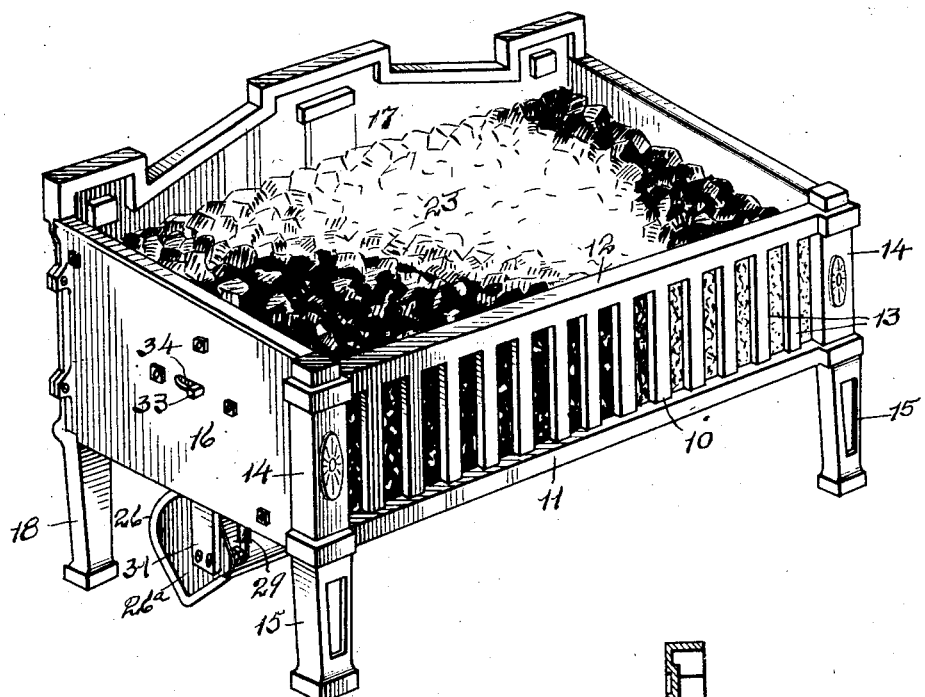
Figure 1 is a perspective view of the grate as a whole showing one end of the heating device.

The grate structure with which the heating elements are associated comprises an openwork front 10 having a lower rail 11, an upper rail 12, vertical grate bars 13, and standards 14, which latter terminate in legs 15 which serve to elevate the grate proper above the level of the hearth. The front may be of any ornamental finish or design, and being detachable from the remainder of the structure may be readily removed therefrom to permit fronts of various designs to be associated with a grate structure of standard construction.

The grate body further comprises end walls 16 to which the front is removably secured. The grate further comprises a back wall 17 to which the end walls are secured, and the back wall is provided with legs 18 which, in conjunction with the legs 15, serve to support and elevate the grate to the desired level to make provision for the heating elements which are located beneath the grate.

The grate is further provided with a removable bottom plate 19 the front edge of which rests upon an inturned ledge 20 on the front and ledges 21 on the end wall, but if desired this bottom plate can be completely removed or omitted, so that the illumination, presently to be described, will be cast downwardly upon the hearth and reflected therefrom to increase the simulation of natural fire in conjunction with the dissemination of heat by the heating elements located below the grate. Within the grate is a mesh partition 22 of angled formation which affords a space above and in front of the mesh for the support of a bed of artificial fuel 23 of transparent or translucent material such as colored glass or the like, which fuel is illuminated from within by means of one or more electric bulbs 24 secured to the rear wall of the grate. A flickering effect is obtained by the provision of one or more rotatable fans 25 located above the respective bulbs and adapted to be rotated by the heated air arising from the bulbs.

Figure 2:
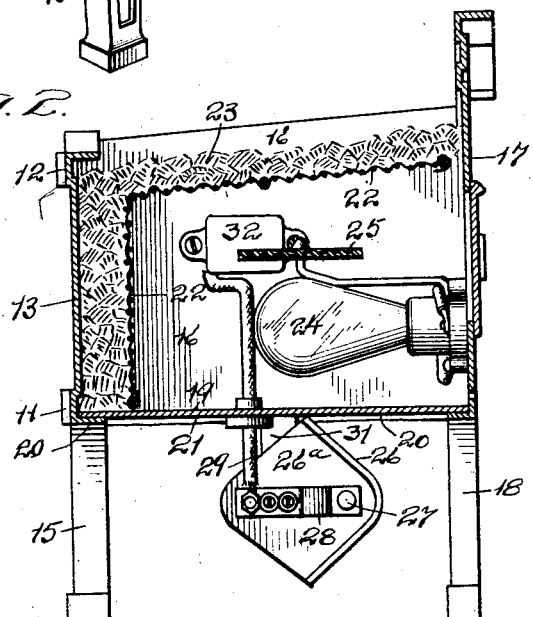
Fig. 2 is a cross sectional view showing the interior of the grate with the heater below the grate.

The general structure of the grate and illuminating features forms the subject of the application from which the present application is divided, so that these features need not be described in further detail. Beneath the floor of the grate is an elongated reflector 26, the walls of which diverge forwardly in an upward and downward direction, as indicated in Fig. 2. The reflector is provided with end walls 26$^a$ of substantially rectangular shape with their forward edges protruding beyond and in front of the rear walls of the reflector.

Lying within the bend or angle of the reflector is an elongated resistance element 27 of any suitable or approved form, the ends of which are entered into and carried by a pair of inwardly extending brackets 28 to which are secured the ends of current wires 29 and 30 respectively. The brackets are secured to the end walls of the reflector, and the reflector as a whole is suspended by hangers 31 the upper ends of which are angled and rest upon the ledges provided along the lower edges of the end walls.

The reflector is located beneath the bottom plate and well to the rear of the grate so that it will be well concealed from view, and when in use will reflect both heat and light forwardly from beneath the grate at a point well chosen to guard against dissemination of heat in a rearward direction, with the result that the heat and light thus reflected will appear to be derived from the glowing coals, thereby adding to the attractiveness of the grate and affording adequate means for heating the room to a very considerable degree. The wire 29 leads upwardly through the bottom wall of the grate and connects with one of the terminals of a heater switch 32 having a finger lever 33 which extends through a slot 34 in the proximate end wall to afford easy and convenient manipulation of the switch. Suitable lighting circuit wires 35 and a lighting switch 36 are provided but it is not deemed necessary to describe the details of the lighting circuit.

The arrangement is one which permits the heater or lights to be operated individually or in unison with one another, so that the grate can be used either as a heater or merely for decorative effect or for both purposes, as occasion may require. This will be found of great advantage in warm weather, when it is desired to dispense with the heating effect, but at the same time preserve the pleasant and attractive illuminating effect of an open fire.

The arrangement of the heater is such as to make provision for the direct forward dissemination of the heat without interference from the illuminating features of the grate and from a low point so that the heat waves will be directed forwardly from beneath the grate at the floor level, thereby serving to warm the lower portion of the room, and at the same time the bottom of the grate, when in position, serves effectively to direct the heat waves forwardly so that the heat will appear to emanate from a glowing bed of coals.

Furthermore, the illuminating effect of the heating elements will effectively combine with the flickering light effect produced on the artificial fuel by concealed illuminating elements, so that these features, in conjunction with one another, will heighten the simulation of a glowing bed of coals and disseminate light downwardly upon the hearth as well as forwardly and upwardly from the artificial fuel.

We claim:

In an electric fireplace, the combination of a box-like four sided grate structure having a grated front, a back in spaced relation thereto and end walls converging from the front to the back, a leg at each corner of the structure for supporting the same in elevated relation with respect to the hearth, a reticulated support for artificial fuel located within the grate and having its supporting surfaces in spaced relation behind the grated front and below the top of the grate structure, artificial fuel carried by said support and exposed over the top and in front thereof to simulate a bed of coals, illuminating devices within the grate structure and below and behind the artificial fuel for illuminating the same, an elongated open fronted reflector extending lengthwise of and below the grate structure and behind the transverse center thereof, said reflector being trough shaped, hangers at the ends of the deflector for supporting the same below the fuel supporting portion of the grate and within the space subtended by the legs, an elongated heating element extending lengthwise of the trough shaped reflector and located near the inner angle thereof, current wires leading to the illuminating devices and to the heating element, and switch mechanism for controlling the flow of current to either or both of said heating and illuminating devices, substantially as described.

DANIEL N. MEANY.
EDWARD N. ELLSWORTH.